(12) United States Patent
Aizawa et al.

(10) Patent No.: US 9,738,266 B2
(45) Date of Patent: Aug. 22, 2017

(54) ENGINE CONTROLLER TO REDUCE HAZARDOUS EMISSIONS

(71) Applicant: MITSUBISHI JIDOSHA KOGYO KABUSHIKI KAISHA, Tokyo (JP)

(72) Inventors: Jun Aizawa, Anjo (JP); Wataru Matsumura, Okazaki (JP); Shingo Sonoda, Chiryu (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 240 days.

(21) Appl. No.: 14/224,987

(22) Filed: Mar. 25, 2014

(65) Prior Publication Data

US 2014/0297166 A1    Oct. 2, 2014

(30) Foreign Application Priority Data

Mar. 26, 2013  (JP) ................................ 2013-065097
Feb. 20, 2014  (JP) ................................ 2014-030557

(51) Int. Cl.
*B60L 11/18* (2006.01)
*B60W 20/00* (2016.01)
(Continued)

(52) U.S. Cl.
CPC ........ *B60W 20/1082* (2013.01); *B60W 10/06* (2013.01); *B60W 10/08* (2013.01);
(Continued)

(58) Field of Classification Search
CPC .. B60W 20/1082; B60W 10/06; B60W 10/08; B60W 2510/0676; B60W 2530/12;
(Continued)

(56) References Cited

U.S. PATENT DOCUMENTS 6,044,831 A  *  4/2000  Takagi ................ F02D 41/0032
                                              123/520
6,435,294 B1 *  8/2002  Hara ........................ B60K 6/48
                                              180/65.25
(Continued)

FOREIGN PATENT DOCUMENTS

JP            2009-29386 A       2/2009

*Primary Examiner* — Hai Huynh
*Assistant Examiner* — Gonzalo Laguarda
(74) *Attorney, Agent, or Firm* — Birch, Stewart, Kolasch & Birch, LLP (57) ABSTRACT

An engine controller includes: a warm-up control unit that performs warm-up operation for letting the engine continuously operate until an integration value of air intake of the engine comes to a predetermined integration value in order to warm up a catalyst provided in an exhaust system when the engine is first started after start-up of the vehicle; and a continuation control unit that lets the engine continuously operate for a predetermined period subsequent to an end of the warm-up operation. The continuation control unit takes an output value of the engine as a request output value when the request output value of the engine is a predetermined idling output value or more that is smaller than the predetermined warm-up output value and takes the output value as the warm-up output value when the request output value is less than the predetermined idling output value.

5 Claims, 8 Drawing Sheets

(51) Int. Cl.
*B60W 10/06* (2006.01)
*B60W 10/08* (2006.01)
*B60W 20/16* (2016.01)
*B60K 6/445* (2007.10)
*B60K 6/52* (2007.10)

(52) U.S. Cl.
CPC ............. *B60W 20/16* (2016.01); *B60K 6/445* (2013.01); *B60K 6/52* (2013.01); *B60W 20/00* (2013.01); *B60W 2510/0676* (2013.01); *B60W 2510/244* (2013.01); *B60W 2530/12* (2013.01); *B60W 2710/0677* (2013.01); *B60W 2710/0694* (2013.01); *B60W 2710/086* (2013.01); *B60Y 2300/474* (2013.01); *Y02T 10/54* (2013.01); *Y02T 10/6239* (2013.01); *Y02T 10/6265* (2013.01); *Y02T 10/6286* (2013.01); *Y10S 903/905* (2013.01)

(58) Field of Classification Search
CPC . B60W 2710/0677; B60W 2710/0694; B60W 2710/086; B60K 6/445; B60K 6/52; B60K 6/44; B60K 6/48; B60K 6/442; B60Y 2300/474; Y02T 10/6234; Y02T 10/6265; Y02T 10/7077; Y10S 903/905
USPC .............................. 180/65.1, 65.225; 60/300
See application file for complete search history.

(56) References Cited

U.S. PATENT DOCUMENTS

2010/0300383 A1\* 12/2010 Pursifull ................. F02B 69/06
  123/21
2010/0300414 A1\* 12/2010 Pursifull ................. F01N 11/00
  123/559.1

\* cited by examiner

ENGINE CONTROLLER TO REDUCE HAZARDOUS EMISSIONS

BACKGROUND

The present invention relates to an engine controller for controlling an engine mounted in a vehicle.

Patent Document 1 discloses prohibiting, under a certain condition, occurrence of switching from an EV (electric vehicle) mode in which the vehicle travels by use of a motor to a hybrid traveling mode in which the vehicle travels by activation of an engine.

Specifically, a technique disclosed in connection with Patent Document 1 aims at improving fuel consumption by controlling driving of the engine.

An engine catalyst has heretofore been known as remaining inactive in a cold state and exhibits degradation in capability of purifying an automobile gas emission. Accordingly, if an attempt is made to increase an engine output in a state where the engine catalyst remains inactive, contents of hazardous substances in the automobile gas emission may increase.

In a hybrid car, even when a necessity to start the engine has arisen, a necessary output can be acquired for a short period of time so that the motor is driven by electric power fed from a battery. For this reason, when the engine is started in a circumstance where the engine catalyst is at a low temperature, a catalyst warm-up mode is set within a predetermined warm-up period. In the catalyst warm-up mode, an output value of the engine is set to a predetermined limit value in spite of a required output value of the engine. The limit value is set so that standards for automobile gas emission regulations can be fulfilled even when the engine catalyst remains in active.

If the warm-up period is too long, the battery may be excessively consumed. For this reason, the warm-up period is generally determined to such an extent that the engine catalyst can be made active to a minimum required extent. For this reason, there is no guarantee that the engine catalyst is sufficiently made active in the catalyst warm-up mode.

When the necessity of driving the engine in the warm-up period becomes obviated, the engine is stopped concurrently with the end of the warm-up period, a shift to the EV mode takes place. When another necessity of starting the engine additionally arises, a shift to the hybrid traveling mode newly takes place. If the engine catalyst is made active to a certain extent, the catalyst warm-up mode will not be set. Accordingly, despite a state in which the engine catalyst is not sufficiently made active, the engine output can be increased such that a required output is obtained. In such a circumstance, there could be an increase in contents of hazardous substances in the automobile gas emission.

Figure 8:
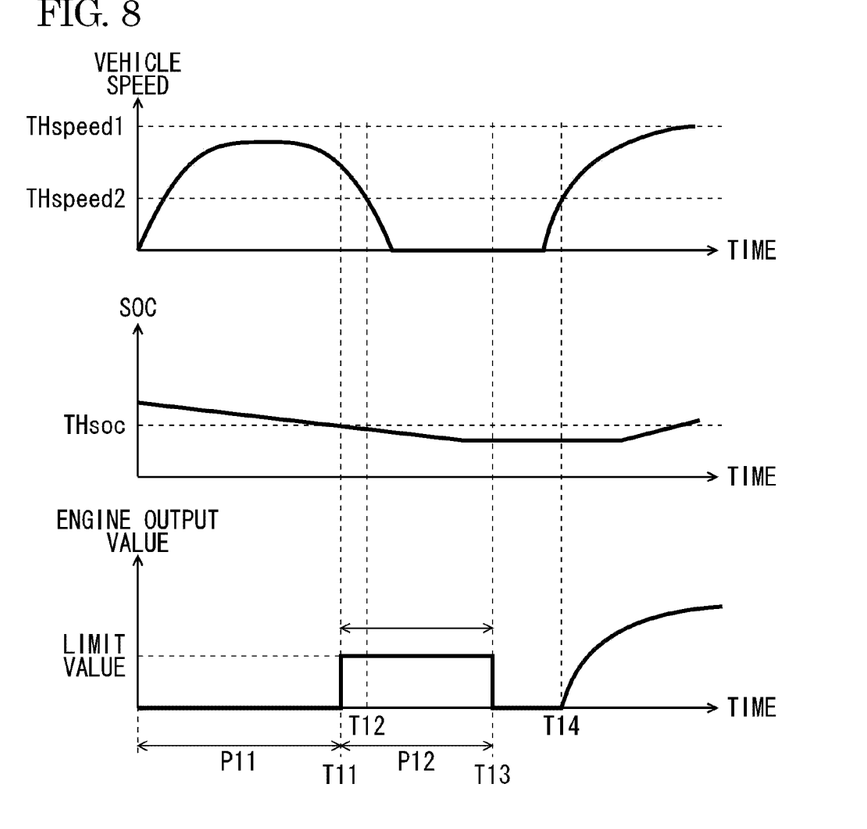
FIG. 8 is a graph illustrating an example of operating condition in which contents of hazardous substances in an automobile gas emission might increase.

By way of example, as illustrated in FIG. 8, in a period P11 during which an SOC (state of charge) is a threshold value THsoc or more; during which a vehicle request output becomes low; and during which a vehicle speed comes to a threshold value THspeed1 or less, the vehicle shifts to the EV mode in which the engine is stopped regardless of the vehicle speed. In this case; however, when the vehicle request output becomes high or when the vehicle speed comes to the threshold value THspeed1 or more, the engine is started even when the SOC is the threshold value THsoc or more.

At time point T11, the vehicle speed is threshold value THspeed2 or more, and the SOC is less than the threshold value THsoc. Therefore, the engine is started. However, the catalyst warm-up mode is set in a warm-up period P12 at the beginning of engine starting, whereupon the output value of the engine is limited to a limit value.

Although the vehicle speed becomes less than the threshold value THspeed2 at time point T12, the engine is not stopped in the warm-up period P12.

The warm-up period P12 ends at time point T13, and the vehicle speed is less than the threshold value THspeed2, so that the engine is stopped.

The SOC is still less than the threshold value THsoc at time point T14, and the engine is re-started in response to the vehicle speed's increase in excess of the threshold value THspeed2. Subsequently, the output value of the engine is controlled so that the required output value is obtained.

In such a case, the engine operates in only the warm-up period P12, the engine catalyst might not be sufficiently made active. When the engine is re-started at time T14, the contents of the hazardous substances in the automobile gas emission could increase when the engine is re-started at time point T14.

As is clear from the above descriptions, when an operation period of the engine concomitant with initial starting of the engine has become only the warm-up period, the engine catalyst may be insufficiently made active, and the contents of hazardous substances in the automobile gas emission might increase when the engine is re-started

[Patent Document 1] JP-A-2009-29386

SUMMARY

The invention aims at providing an engine controller capable of reducing contents of hazardous substances in an automobile gas emission.

According to an advantageous aspect of the invention, an engine controller is for controlling an engine of a vehicle that travels by intermittently driving an engine on the basis of a request output value. The engine controller includes a warm-up control unit that performs warm-up operation for letting the engine continuously operate while setting an output value of the engine in a predetermined warm-up output value until an integration value of air intake of the engine comes to a predetermined integration value in order to warm up a catalyst provided in an exhaust system of the engine, when the engine is first started after start-up of the vehicle; and a continuation control unit that lets the engine continuously operate for a predetermined period subsequent to an end of the warm-up operation. The continuation control unit takes an output value of the engine as a request output value when the request output value of the engine is a predetermined idling output value or more that is smaller than the predetermined warm-up output value, and takes the output value of the engine as the warm-up output value when the request output value is less than the predetermined idling output value.

The engine controller further may include a coolant temperature detection unit that detects a temperature of coolant of the engine; and a setup unit that sets a time period of operation of the engine by the continuation control unit on the basis of the temperature of the coolant of the engine when the engine is started. The setup unit may be configured so as to make the predetermined period shorter as the temperature of the coolant when the engine is started increases.

The engine controller further may include a generator that is driven by the engine to generate electric power. The continuation control unit may be configured so as to drive the generator by means of an output of a difference between the predetermined idling output value and the request output value when the request output value is less than the predetermined idling output value.

DETAILED DESCRIPTION OF EXEMPLIFIED EMBODIMENTS

An automobile outfitted with an engine controller of an embodiment of the invention is described by reference to FIGS. 1 through 5 and 7.

A plug-in hybrid electric vehicle is exemplified in the embodiment. The invention; however, can be implemented likewise in various types of other hybrid vehicles each of which is outfitted with an engine and an electric system for driving while using an electric motor as a power source.

Figure 1:
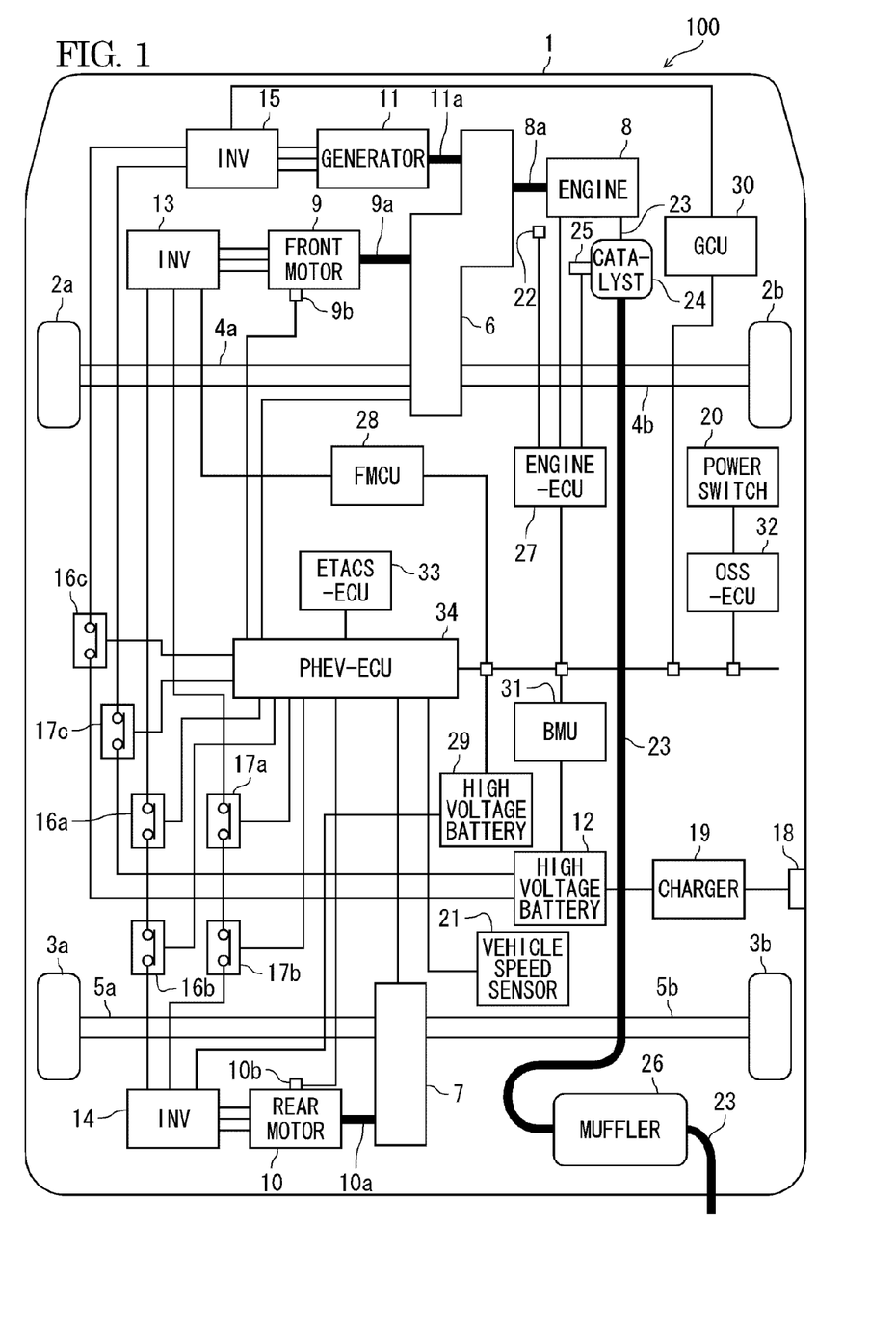
FIG. 1 is a schematic illustrating a configuration of an automobile outfitted with an engine controller of an embodiment of the invention.

FIG. 1 is a schematic illustrating a configuration of an automobile 100. The automobile 100 is equipped with a plurality of elements analogous to elements provided in another existing plug-in hybrid automobile. However, FIG. 1 illustrates only some of the elements.

The automobile 100 includes a main body 1; front wheels 2a and 2b; rear wheels 3a and 3b; axel shafts 4a, 4b, 5a, and 5b; transmission mechanisms 6 and 7; an engine 8; a front motor 9; a rear motor 10; a generator 11; a high voltage battery 12; inverters 13, 14, and 15; contactors 16a, 16b, 16c, 17a, 17b, and 17c; an external power feed plug 18; a charger 19; a power switch 20; a vehicle speed sensor 21; an exhaust pipe 23; an engine catalyst 24; a temperature sensor 25; a muffler 26; an engine-ECU (electric control unit) 27; a front motor control unit (hereinafter referred to as an "FMCU") 28; a rear motor control unit (hereinafter referred to as an "RMCU") 29; a generator control unit (hereinafter referred to as a "GCU") 30; a battery management unit (hereinafter referred to as a "BMU") 31; an OSS (one-touch start system)-ECU 32; an ETACS (electric time and alarm control system)-ECU 33; and a PHEV (plug-in hybrid electric vehicle)-ECU 34.

The main body 1 includes a chassis and an automobile body; supports other elements; and forms a space (compartment) by way of which passengers get on the automobile.

The front wheels 2a and 2b are fastened to ends of the respective axel shafts 4a and 4b. The rear wheels 3a and 3b are fastened to ends of the respective axel shafts 5a and 5b. The front wheels 2a and 2b and the rear wheels 3a and 3g support the main body 1 while being grounded and are also turned to thereby move the main body 1.

The axel shafts 4a and 4b maintain relative positions between the main body 1 and the front wheels 2a and 2b in a predetermined state and also transmits torque sent from the transmission mechanism 6 to the front wheels 2a and 2b.

The axel shafts 5a and 5b maintain relative positions between the main body 1 and the rear wheels 3a and 3b and transmits torque sent from the transmission mechanism 7 to the rear wheels 3a and 3b.

The transmission mechanism 6 rotatably, individually supports the axel shafts 4a and 4b. A rotary shaft 8a of the engine 8, a rotary shaft 9a of the front motor 9, and a rotary shaft 11a of the generator 11 are individually connected to the transmission mechanism 6. The transmission mechanism 6 is made by combining various types of gears including differential gears, shafts, and clutches with each other in a well-known manner. The transmission mechanism 6 selectively creates a state of connecting the rotary shaft 8a to the axel shafts 4a and 4b, a state of connecting the rotary shaft 8a to the rotary shaft 11a, a state of distributing the torque of the rotary shaft 8a to the axel shafts 4a and 4b and the rotary shaft 11a, a state of connecting the rotary shaft 9a to the axel shafts 4a and 4b, and a state of letting the axel shafts 4a and 4b freely rotate.

The transmission mechanism 7 rotatably, individually supports the axel shafts 5a and 5b. A rotary shaft 10a of the rear motor 10 is connected to the transmission mechanism 7. The transmission mechanism 7 is made by combining various gears including differential gears, shafts, and clutches with each other in a well-known manner. The transmission mechanism 7 selectively creates a state of connecting the rotary shaft 10a to the axel shafts 5a and 5b and a state of letting the axel shafts 5a and 5b freely rotate.

The engine 8 generates torque by utilization of fuel, thereby rotating the rotary shaft 8a. The engine 8 typically uses gasoline as fuel but can also utilize another fuel oil, like a diesel oil, or fuel other than gasoline, such as an LPG (liquefied petroleum gas). When the transmission mechanism 6 is connected to the rotary shaft 8a and the axel shafts 4a and 4b, the engine 8 rotates the front wheels 2a and 2b.

The front motor 9 and the rear motor 10 generate torque by utilization of electric energy, thereby rotating the rotary shafts 9a and 10a. When the transmission mechanism 6 connects the rotary shaft 9a to the axel shafts 4a and 4b, the front motor 9 rotates the front wheels 2a and 2b. When the transmission mechanism 7 connects the rotary shaft 10a to the axel shafts 5a and 5b, the rear motor 10 rotates the rear wheels 3a and 3b. A rotation angle sensor 9b is attached to the front motor 9, and a rotation angle sensor 10b is attached to the rear motor 10. The rotation angle sensor 9b detects the number of rotations of the front motor 9, and the rotation angle sensor 10b detects the number of rotations of the rear motor 10.

The generator 11 generates electric power by utilization of rotation of the rotary shaft 11a and by means of electromagnetic induction. When the transmission mechanism 6 connects the rotary shaft 8a to the rotary shaft 11a, the generator 11 generates electric power by utilization of the torque induced by the engine 8. When the transmission mechanism 6 connects the axel shafts 4a and 4b to the generator 11, the generator 11 generates electric power by utilization of rotational force of the axel shafts 4a and 4b.

The high voltage battery (electric battery) 12 includes a battery module made by a series connection of a plurality of battery cells. DC currents originating from the respective battery cells are added to thus generate high voltage DC power used for driving the front motor 9 and the rear motor 10.

The inverters 13 and 14 convert the DC current output from the high voltage battery 12 into an AC current. The inverters 13 and 14 may also have a known configuration including a switching element, like an IGBT. The inverter 13 feeds an AC current to the front motor 9, thereby activating the front motor 9. The inverter 14 feeds an AC current to the rear motor 10, thereby activating the rear motor 10. Under control of the FMCU 28 and the RMCU 29, the inverters 13 and 14 change a switching frequency of a switching element and a current value and a frequency of an electric current to be output.

The inverter 15 converts the AC current generated by the generator 11 into a DC current. The DC current received by the inverter 15 is supplied to the high voltage battery 12.

The contactor 16a is interposed between an anode of the high voltage battery 12 and the inverter 13; the contactor 16b is interposed between the anode and the inverter 14; and the contactor 16c is interposed between the anode and the inverter 15. Under control of the PHEV-ECU 34, the contactors 16a, 16b, and 16c toggle on or off respective electrical connections between the anode of the high voltage battery 12 and the inverters 13, 14, and 15.

The contactor 17a is interposed between a cathode of the high voltage battery 12 and the inverter 14; the contactor 17b is interposed between the cathode and the inverter 15; and the contactor 17c is interposed between the cathode and the inverter 16. Under control of the PHEV-ECU 34, the contactors 17a, 17b, and 17c toggle on or off respective electrical connections between the cathode of the high voltage battery 12 and the inverters 13, 14, and 15.

In case of necessity, a cable for receiving a power supply from an external power source can be connected to the external power feed plug 18. When the cable is connected, the external power feed plug 18 electrically connects the cable with the charger 19.

The charger 19 charges the high voltage battery 12 with the electric power fed from the external power source by way of the cable connected to the external power feed plug 18.

The power switch 20 is one that is actuated by the user in order to switch an operating state (an OFF state, an ACC state, an ON state, a READY state, and the like) of the automobile 100. In this respect, the READY state is a state of enabling the traveling system to thereby make a travel possible.

The vehicle speed sensor 21 detects vehicle speed from rotation speed of the axel shaft 5b.

A coolant temperature sensor 22 detects a temperature of coolant in the engine 8.

The exhaust pipe 23 guides an automobile gas emission produced by the engine 8 to a rear end of the main body 1, emitting the gas to the atmosphere.

The engine catalyst 24 is placed at a midpoint on the exhaust pipe 23 and eliminates hazardous components in the automobile gas emission flowing through the exhaust pipe 23.

The temperature sensor 25 detects a temperature of the engine catalyst 24.

The muffler 26 is placed at some midpoint on the exhaust pipe 23 and muffles sounds that develop during emission of the automobile gas emission flowed through the exhaust pipe 23 to the atmosphere.

The engine-ECU 27 controls operation of the engine 8. Namely, the engine-ECU 2 is equivalent to an engine controller.

Under control of the PHEV-ECU 34, the FMCU 28 controls the inverter 13 so as to drive the front motor 9 in order to accomplish a required traveling state.

Under control of the PHEV-ECU 34, the RMCU 29 controls the inverter 14 so as to drive the rear motor 10 in order to accomplish the required traveling state.

The GCU 30 controls the inverter 15 such that there is obtained a DC current suitable for being supplied to the high voltage battery 12 despite a change in an amount of electricity generated by the generator 11.

The BMU 31 manages a state, such as a voltage and a state of charge, of the high voltage battery 12.

When the user operates the power switch 20, the OSS-ECU 32 performs power control of individual sections after performance of a communication for authentication.

The ETACS-ECU 33 controls various electric components provided in the automobile 100. Electric components to be controlled by the ETACS-ECU 33 include; for instance, headlamps, door mirrors, wipers, a door lock mechanism, interior illumination, a security alarm, and others. The ETACS-ECU 33 controls various electric components in order to implement predetermined operations while acquiring necessary information by establishing a communication with the PHEV-ECU 34 as required. By way of example, if the door mirrors stay folded when the vehicle speed has come to a specified value or more, the ETACS-ECU 33 automatically unfolds the door mirrors.

The PHEV-ECU 34 performs various types of control processing pertinent to traveling of the automobile 100. For instance, the PHEV-ECU 34 controls a state of the transmission mechanisms 6 and 7 on the basis of a traveling state of the automobile 100. The PHEV-ECU 34 controls states of the contactors 16a, 16b, 16c, 17a, 17b, and 17c. By way of example, in an EV (electric vehicle)-mode driving state, the PHEV-ECU 34 brings the transmission mechanism 6 into a state in which the transmission mechanism 6 connects the rotary shaft 9a of the front motor 9 to the axel shafts 4a and 4b; brings the transmission mechanism 7 into a state in which the transmission mechanism 7 connects the rotary shaft 10a of the rear motor 10 to the axel shafts 5a and 5b; and holds all of the contactors 16a, 16b, 16c, 17a, 17b, and 17c in an ON state. In this state, the PHEV-ECU 34 calculates a required travel output in accordance with an angle of an accelerator pedal detected by an unillustrated accelerator pedal angle sensor, and commands the FMCU 28 and the RMCU 29 to operate the front motor 9 and the rear motor 10 so as to produce the travel output. In addition, the PHEV-ECU 34 controls individual sections so as to bring about various operating states, such as those implemented by other existing plug-in hybrid automobiles, when necessary.

The engine-ECU 27, the FMCU 28, the RMCU 29, the GCU 30, BMU 31, the OSS-ECU 32, and the PHEV-ECU 34 are all connected to a common communication line and establish communications to thereby exchange information necessary for various controls.

Of the elements, the front wheels 2a and 2b, the rear wheels 3a and 3b, the axel shafts 4a, 4b, 5a, and 5b, the transmission mechanisms 6 and 7, the engine 8, the front motor 9, the rear motor 10, the generator 11, the high voltage battery 12, the inverters 13, 14, and 15, the contactors 16a, 16b, 17a, 17b, and 17c, the charger 19, the FMCU 28, the RMCU 29, the GCU 30, the BMU 31, and the PHEV (plug-in hybrid electric vehicle)-ECU 34 are constituent elements of the traveling system.

Figure 2:
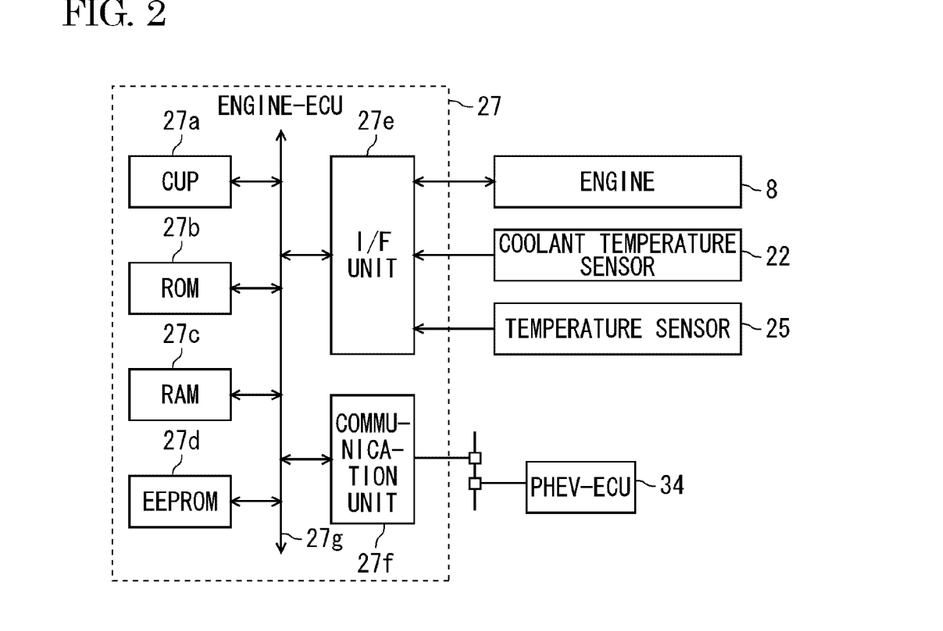
FIG. 2 is a block diagram of an engine-ECU illustrated in FIG. 1.

FIG. 2 is a block diagram of the engine-ECU 27. In FIG. 2, the elements that are identical with those illustrated in FIG. 1 are assigned the same reference numerals.

The engine-ECU 27 includes a CPU (central processing unit) 27a, ROM (read-only memory) 27b, RAM (random-access memory) 27c, EEPROM (electrically erasable programmable read-only memory) 27d, an interface unit (I/F unit) 27e, and a communication unit 27f. The elements are respectively connected to a bus line 27g.

The CPU 27a is equivalent to a central portion of a computer built in the engine-ECU 2. The CPU 27a performs information processing for controlling the engine 8 on the basis of an operating system and an application program that are stored respectively in the ROM 27b and the RAM 27c.

The ROM 27b is equivalent to main memory of the computer. The ROM 27b stores the operating system. The ROM 27b sometimes stores application programs.

The RAM 27c is equivalent to the main memory of the computer. The RAM 27c is utilized as a so-called work area in which data are temporarily stored when the CPU 27a performs various processing.

The EEPROM 27d saves data to be used when the CPU 27a performs various processing and data that will be resultantly generated by means of processing of the CPU 27a.

The application programs stored in the ROM 27b or the EEPROM 27d contain a control program that describes control processing to be mentioned later. When the control program is stored in the EEPROM 27d, the engine-ECU 27, a unit including the engine-ECU 27, or the automobile 100 is generally transferred with the EEPROM 27d included in the EEPROM 27d. The engine-ECU 27, the unit including the engine-ECU 27, or the automobile 100; however, can also be transferred without the control program being stored in the EEPROM 27d. In this regard, a separately-transferred control program can also be written into the EEPROM 27d. Transfer of the control program in this situation can be performed by way of a network or while the control program is recorded in a removable recording medium, like a magnetic disc, a magneto-optical disc, an optical disc, and semiconductor memory. The transfer of the control program can be performed regardless of whether or not compensation is received.

The interface unit 27e establishes an electrical connection among the engine 8, the coolant temperature sensor 22, and the temperature sensor 25. Under control of the CPU 27a, the interface unit 27e outputs control information for controlling the engine 8. The interface unit 27e brings in a detection value output from the coolant sensor 22 and a detection value output from the temperature sensor 25 and writes the values into the RAM 27c.

The communication unit 27f establishes a communication with the PHEV-ECU 34 on order from the CPU 27a.

Operation of the automobile 100 configured as above is now described.

For instance, when the power switch 20 is pressed while an unillustrated brake pedal is pressed, the OSS-ECU 32 activates the respective sections in order to bring the automobile 100 in a READY state. The engine-ECU 27 is also activated at this time. When the engine-ECU 27 is activated in this way, the CPU 27a starts control processing illustrated in FIGS. 3 and 4 in accordance with a control program stored in the ROM 27b or the EEPROM 27d. In this regard, details of processing which will be described below are mere illustrative, and various types of processing that make it possible to yield a similar result are accordingly available.

Figure 3:
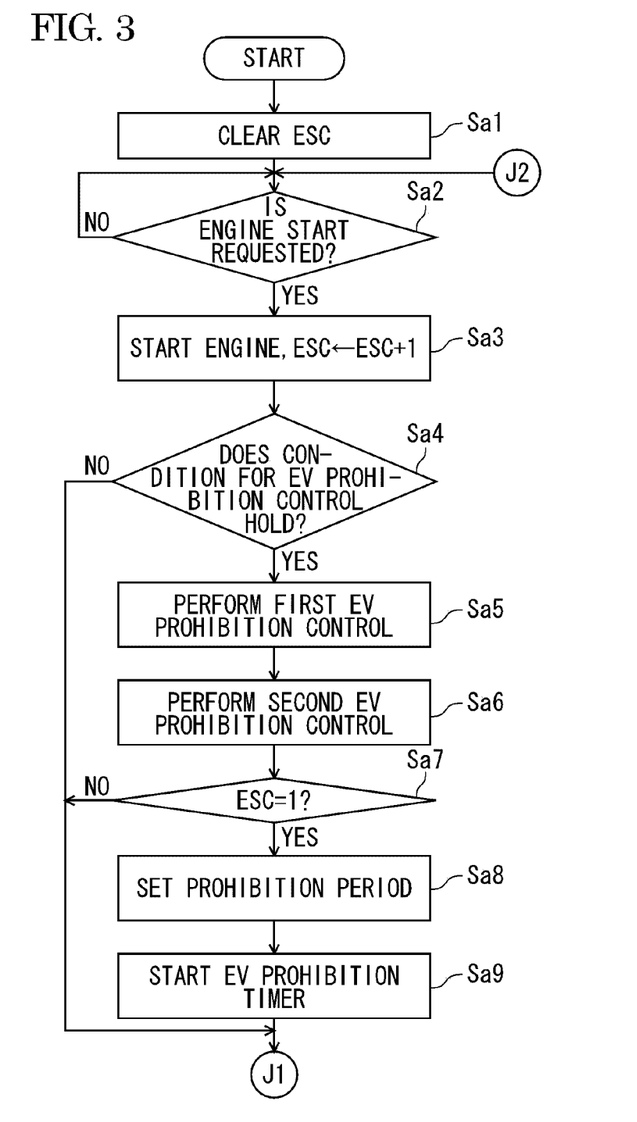
FIG. 3 is a flowchart of control processing performed by a CPU illustrated in FIG. 2.

In step Sa1, the CPU 27a clears an engine start counter (hereinafter referred to as "ESC") to 0.

In step Sa2, the CPU 27a checks whether or not a request for starting the engine is issued by the PHEV-ECU 31. When rendering NO as a determination because the start request is not issued, the CPU 27 returns to step Sa2. In short, the CPU 27a waits until a start request is issued in step Sa2. When the start request is issued, the CPU 27a proceeds to step Sa3.

In step Sa3, the CPU 27a starts the engine 8. In addition, the CPU 27a also increments the value of the ECU by one.

In step Sa4, the CPU 27a checks whether or not a condition for performing EV prohibition control is fulfilled. The condition for EV prohibition control is determined on the basis of whether or not the engine is first started after activation of the vehicle. When YES is rendered as a determination because the condition for EV prohibition control is fulfilled, the CPU 27a proceeds to step Sa5.

In step Sa5, the CPU 27a starts integrating air intakes of the engine as first EV prohibition control. The air intake of the engine is detected by an airflow sensor fitted on an air intake system of the engine. First EV prohibition control is continued until the air intake of the engine comes to a predetermined integration value. The predetermined integration value can also be corrected on the basis of the coolant temperature of the engine.

In step Sa6, the CPU 27a starts performing a second EV prohibition control. Under the second EV prohibition control, a shift to the EV mode is prohibited until the count value of an EV prohibition timer comes to 0. Second EV prohibition control specifically includes steps Sa7 to Sa9.

In step Sa7, the CPU 27a checks whether or not the count value of the ECS is "1." The ESC is cleared in step Sa1 only immediately after initiation of control processing; namely, only immediately after the automobile 100 is brought into a READY state. Every time the engine is started, the ESC is incremented by one in step Sa3. Therefore, when the engine 8 is first started after the automobile 100 is brought into the READY state, the ESC is incremented to "1." When rendering YES as a determination in step Sa7 because the ESC assumes a count value of "1," the CPU 27a proceeds to step Sa8.

In step Sa8, the CPU 27a sets a prohibition time on the basis of a coolant temperature detected by the coolant temperature sensor 22. The prohibition time sets a length of a period during which the shift to the EV mode is prohibited. As will be described later, during the period in which the shift to the EV mode is prohibited, the engine 8 intermittently operates. Consequently, the prohibition time corresponds to a time period that is a length of a period for letting the engine 8 operate intermittently. The time period is taken as a first predetermined period. The CPU 27a acts as a setup unit.

Figure 5:
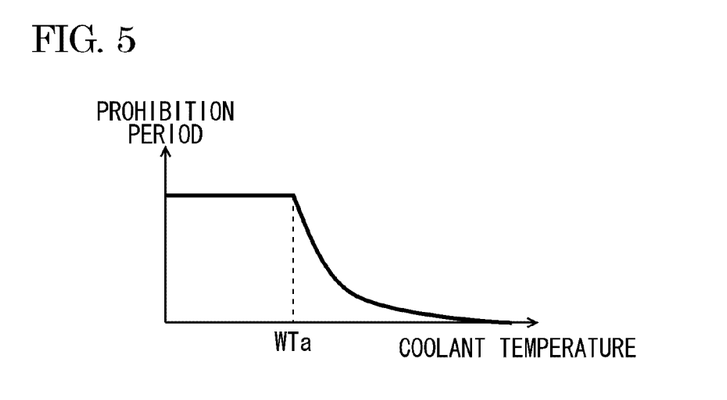
FIG. 5 is a graph illustrating an example of relationship between a coolant temperature and a prohibition time.

FIG. 5 is a drawing illustrating an example of relationship between the coolant temperature and the prohibition time.

In the example illustrated in FIG. 5, when the coolant temperature is less than a temperature WTa, the prohibition time is constant. However, when the coolant temperature is equal to or higher than the temperature WTa, the higher the coolant temperature becomes, the shorter the prohibition time becomes. A data table illustrating such a relationship is stored in the ROM 27b or the EEPROM 27b. The CPU 27a sets as a prohibition time a value that is acquired by reference to the data table in accordance with the value detected by the coolant temperature sensor 22.

In step Sa9, the CPU 27a activates an EV prohibition timer. The EV prohibition timer is a countdown timer and can be embodied by means of; for instance, a software timer which is implemented by another task processing performed by the CPU 27a. The EV prohibition timer performs at predetermined times countdown operation from an initial value corresponding to a prohibition time set in step S8, and the count value comes to 0 at timing when the prohibition time has elapsed.

Figure 4:
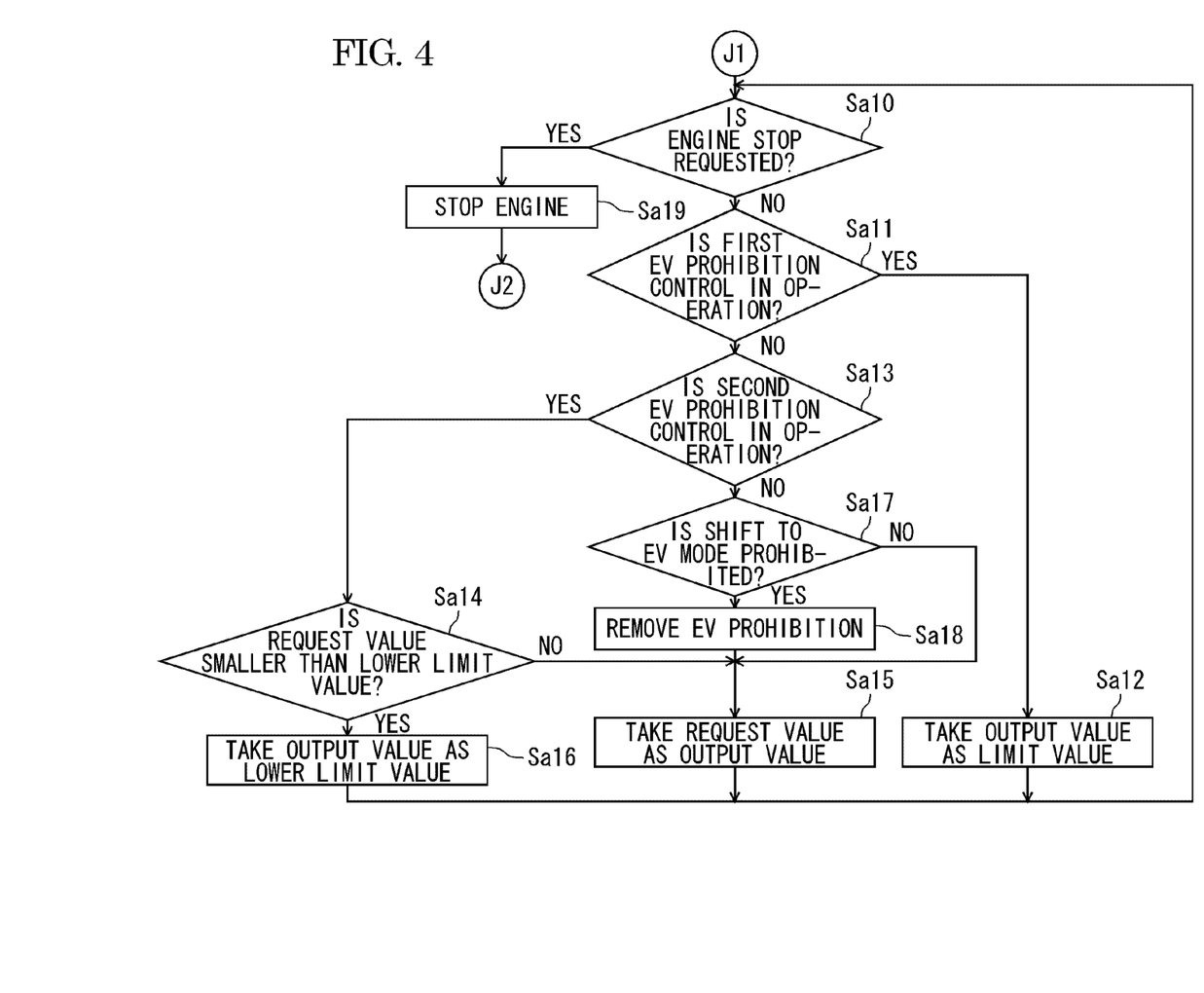
FIG. 4 is a flowchart of control processing performed by the CPU illustrated in FIG. 2.

Subsequently, the CPU 27a proceeds to step Sa10 illustrated in FIG. 4. When rendering NO as a determination in step Sa4 because the condition for EV prohibition control is not fulfilled, the CPU 27a proceeds to step Sa10 illustrated in FIG. 4 while passing on steps Sa5 to Sa9. Also, when rendering NO as a determination in step Sa7 because the ESC assumes a value other than "1," the CPU 27a proceeds to step Sa10 illustrated in FIG. 4 while passing on steps Sa8 and Sa9. Specifically, the EV prohibition timer will not operate unless the engine 8 is first activated since the automobile 1 was brought into the READY state.

In step Sa10, the CPU 27a checks whether or not stoppage of the engine 8 is requested by the PHEV-ECU 34. In this respect, in a state in which a prohibition on the shift to the EV mode is requested in step Sa6, the PHEV-ECU 34 does not make a request for stopping operation of the engine 8. When NO is rendered as a determination because the request for stoppage is not issued, the CPU 27a proceeds to step Sa11.

In step Sa11, the CPU 27a checks whether or not first EV prohibition control is in operation. When YES is rendered as a determination because first EV prohibition control is in operation, the CPU 27a proceeds to step Sa12.

In step Sa12, the CPU 27a takes an output value of the engine 8 as a predetermined warm-up output value (a limit value) regardless of a request value sent from the PHEV-ECU 34. The limit value is arbitrarily set by; for example, a designer. In this regard, the limit value should be set in such a way that the automobile gas emission exiting from the exhaust pipe 23 satisfies the standards for automobile gas emission regulations even when the engine catalyst is not active. Subsequently, the CPU 27a returns to step Sa10.

Thus, when the first EV prohibition control is initiated, the output value of the engine 8 is limited to the limit value. In short, the engine 8 operates in the catalyst warm-up mode.

When rendering NO as a determination in step Sa11 because the first EV prohibition control is not in operation, the CPU 27a proceeds to step Sa13.

In step Sa13, the CPU 27a checks whether or not second EV prohibition control is in operation. When rendering YES as a determination because second EV prohibition control is in operation, the CPU 27a proceeds to step Sa14.

In step Sa14, the CPU 27a checks whether or not the request value is less than a predetermined lower limit value (an idling output value). The lower limit value is arbitrarily set by; for instance, the designer. The lower limit value is set to; for instance, a minimum output value that enables further activation of the engine catalyst 24 after the end of the catalyst warm-up mode, and hence the lower limit value (an idling output value) should be smaller than the warm-up output value. When rendering NO as a determination because the request value is the lower limit value or more, the CPU 27a proceeds to step Sa15. In the meantime, when rendering YES as a determination because the request value is less than the lower limit value, the CPU 27a proceeds to step Sa16.

In step Sa15, the CPU 27a sets the output value of the engine 8 as a request value from the PHEV-ECU 34. Subsequently, the CPU 27a returns to step Sa10.

In step Sa16, the CPU 27a sets the output value of the engine 8 as a lower limit value regardless of the request value from the PHEV-ECU 34. Subsequently, the CPU 27a returns to step Sa10.

In a state in which second EV prohibition is in operation, the output value of the engine 8 is constantly held at the lower limit value or more. Specifically, the engine 8 keeps operating without stopping. In a situation in which an output value which is the lower limit value or more is required, the output value is accordingly increased. Consequently, the operation mode differs from the catalyst warm-up mode.

When rendering NO as a determination in step Sa13 because the EV prohibition timer is not in operation, the CPU 27a proceeds to step Sa17. In this regard, the CPU 27a determines that the EV prohibition timer is not operating even when the EV prohibition timer assumes a count value of 0 after having finished counting the prohibition time as well as when the EV prohibition timer is not activated.

In step Sa17, the CPU 27a checks whether or not the PHEV-ECU 34 is requested to prohibit performance of the shift to the EV mode. When rendering YES as a determination because the request is not canceled in step Sa6, the CPU 27a proceeds to step Sa18.

In step Sa18, the CPU 27a removes the prohibition on the PHEV-ECU 31 from performing the shift to the EV mode. Subsequently, the CPU 27a proceeds to step Sa15. When having rendered NO as a determination in step Sa17 because the PHEV-ECU 34 is not requested to prohibit performance of the shift to the EV mode, the CPU 27a proceeds to step Sa15 while passing on step Sa18.

As above, in a state in which EV prohibition control is not in operation, the output value of the engine 8 is constantly held at the request value.

When rendering YES in step Sa10 because the PHEV-ECU 34 has made a request to stop the engine 8, the CPU 27a proceeds to step Sa19.

In step Sa19, the CPU 27a stops operation of the engine 8. Subsequently, the CPU 2a returns to a waiting state pertinent to step Sa2 illustrated in FIG. 3.

Figure 6:
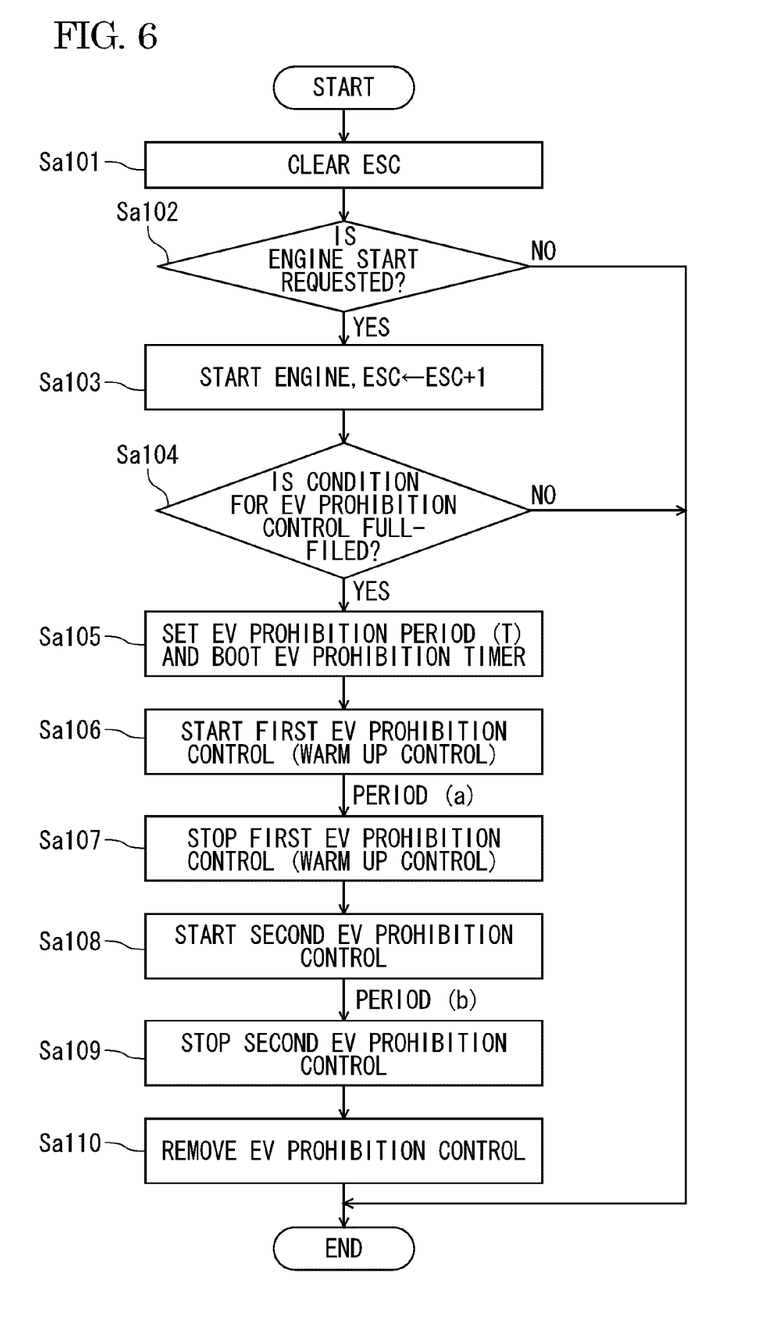
FIG. 6 is a flowchart of control processing performed by a CPU illustrated in FIG. 2 according to another embodiment of the invention.

An automobile outfitted with an engine controller of another embodiment of the invention is described by reference to FIG. 6.

In step Sa101, the CPU 27a clears an engine start counter (hereinafter referred to as "ESC") to 0.

In step Sa102, the CPU 27a checks whether or not a request for starting the engine is issued by the PHEV-ECU 31. When rendering NO as a determination because the start request is not issued, the CPU 27 returns to step Sa102. In short, the CPU 27a waits until a start request is issued in step Sa102. When the start request is issued, the CPU 27a proceeds to step Sa103.

In step Sa103, the CPU 27a starts the engine 8. In addition, the CPU 27a also increments the value of the ECU by one.

In step Sa104, the CPU 27a checks whether or not a condition for performing EV prohibition control is fulfilled. The condition for EV prohibition control is determined on the basis of whether or not the engine is first started after activation of the vehicle. Specifically, it is checked whether the count value of the ECS is "1" or not. When the condition for EV prohibition control is fulfilled (ESC=1), the CPU 27a proceeds to step Sa105.

In step Sa105, the CPU 27a sets an EV prohibition period T on the basis of the coolant temperature of the engine. The EV prohibition period T corresponds to a time period from T3 to T5 in FIG. 7.

In step Sa 106, the CPU 27a starts performing a first EV prohibition control that is the warm-up operation. In this step, a performing period (a) of a first EV prohibition control unit (a warm-up control unit) is a time period until when an integrated value of amount of air intake of the engine comes to a predetermined integration value. The performing period (a) corresponds to a time period from T3 to T4 in FIG. 7. The performing period (a) is a time period needed for warming-up the catalyst.

When the first EV prohibition control is performed, the CPU 27a takes an output value of the engine 8 as a predetermined warm-up output value (a limit value) regardless of a request value sent from the PHEV-ECU 34. The limit value is arbitrarily set by; for example, a designer. In this regard, the limit value should be set in such a way that the automobile gas emission exiting from the exhaust pipe 23 satisfies the standards for automobile gas emission regulations even when the engine catalyst is not active.

Thus, when the first EV prohibition control is initiated, the output value of the engine 8 is limited to the limit value. In short, the engine 8 operates in the catalyst warm-up mode.

In step Sa107, the CPU 27a stops performing the first EV prohibition control.

In step Sa108, the CPU 27a starts performing a second EV prohibition control. In this step, a performing period (b) of a second EV prohibition control unit (a continuation control unit) is a time period which is a difference (T-a) between the EV prohibition period T and the performing period (a). The performing period (a) is a time period which is enough for starting the engine immediately, when the request for starting the engine 8 is issued, after stopping the engine 8 by intermittently driving the engine 8.

When the second EV prohibition control is performed, the CPU 27a checks whether or not the request value is less than a predetermined lower limit value (an idling output value). The lower limit value is arbitrarily set by; for instance, the designer. The lower limit value is set to; for instance, a minimum output value that enables further activation of the engine catalyst 24 after the end of the catalyst warm-up mode, and hence the lower limit value (an idling output value) should be smaller than the warm-up output value.

When the request value is the lower limit value or more, the CPU 27a sets the output value of the engine 8 as a request value from the PHEV-ECU 34.

When the request value is less than the lower limit value, the CPU 27a sets the output value of the engine 8 as a lower limit value regardless of the request value from the PHEV-ECU 34.

In a state in which the second EV prohibition control is performed, the output value of the engine 8 is constantly held at the lower limit value or more. Specifically, the engine 8 keeps operating without stopping. In a situation in which an output value which is the lower limit value or more is required, the output value is accordingly increased. Consequently, the operation mode differs from the catalyst warm-up mode.

In step Sa109, the CPU 27a stops performing the second EV prohibition control.

In the step Sa110, the CPU 27a removes the EV prohibition control.

Figure 7:
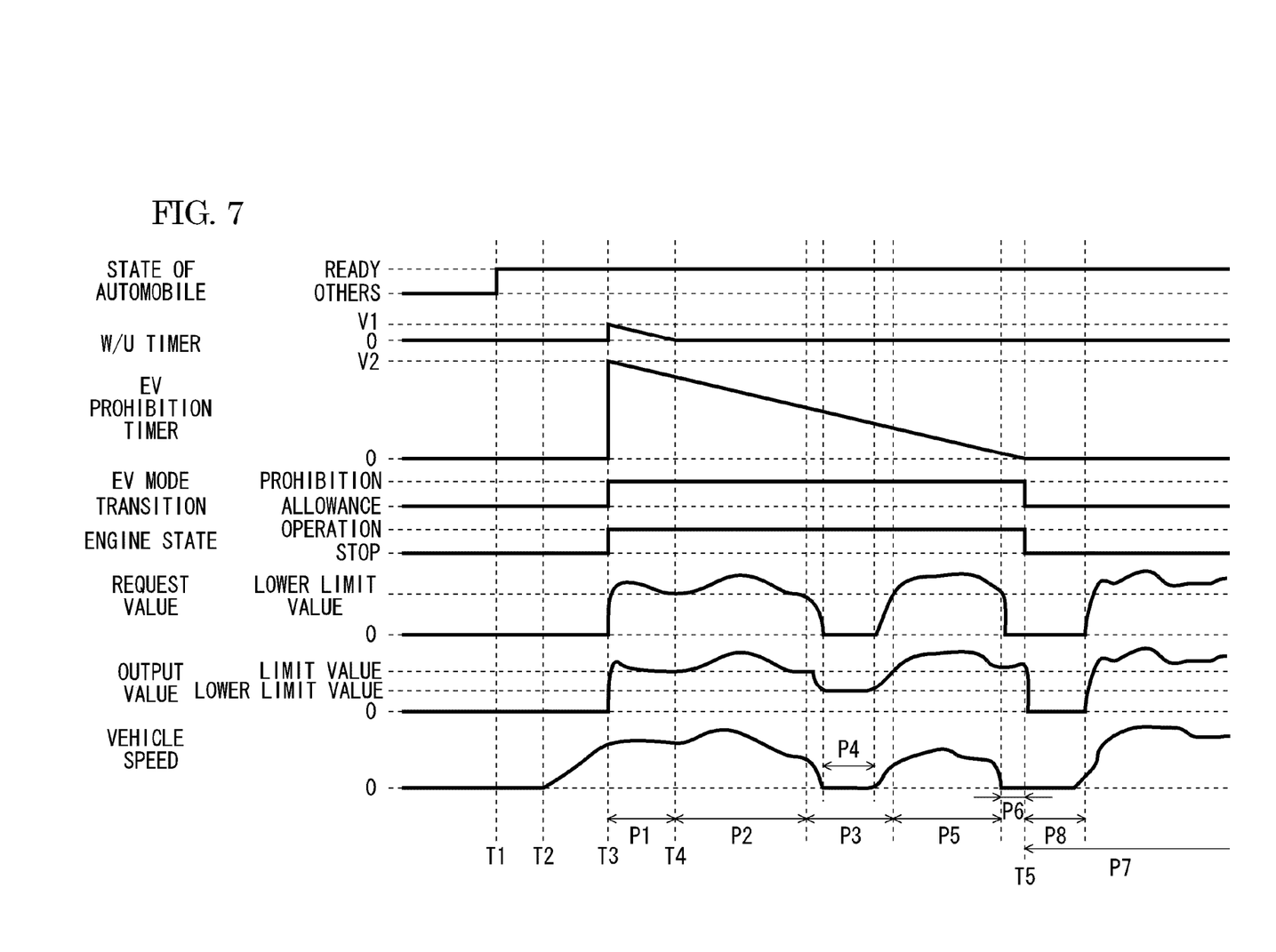
FIG. 7 is a timing chart illustrating example changes in operation of the automobile illustrated in FIG. 1.

FIG. 7 is a timing chart illustrating an example of a change in the operation of the automobile 100 occurred during control processing.

After shifting to the READY state at time point T1, the automobile 100 starts traveling at time point T2. However, the EV mode is initially applied to the automobile 100, and the engine 8 is not started.

A necessity of starting the engine 8 occurs at time point T3. Since the engine catalyst 24 stays cold at this time, EV prohibition control remains activated. In addition, since the start of the engine is the first startup of the engine after occurrence of the shift to the READY state, the EV prohibition timer is started, and the shift to the EV mode is prohibited.

Although the engine 8 is started at time point T3, an output value is limited to the limit value (an idling output value) until first EV prohibition control ends; namely, until the air intake of the engine comes to a predetermined integration value. In other words, the period P1 is a warm-up period.

Although first EV prohibition control ends at time point T4, the EV prohibition timer keeps operating and, therefore, the engine 8 is not stopped. In period P2 that starts from time point T4, the request value is the lower limit value or more, and hence the output value increases up to the request value.

In period P3 subsequent to the period P2, the request value is less than the lower limit value; hence, the output value is made equal to the lower limit value. The request value is zero in period P4 belonging to the period P3, and in this state the engine 8 would conventionally be stopped but is actually held in an operating state. In addition, so long as the generator is driven by utilization of the operating state of the engine 8 and by means of an output of the engine 8 corresponding to a difference between the lower limit value (the idling output value) and the request output value to thereby generate electric power, power generation as well as activation of the engine can be performed.

In period P5 subsequent to the period P3, an operating state analogous to that observed in the period P2 appears. Further, in period P6 subsequent to the period P5, an operating state analogous to that observed in the period P3 appears.

The EV prohibition timer assumes a count value of zero at time point T5. As a result, neither first EV prohibition control nor second EV prohibition control is in effected, whereby the prohibition on the shift to the EV mode remains withdrawn. In period P7 subsequent to the time point T5, the output value is made equal to the request value. In period P8 belonging to the period P7, in particular the request value is 0; hence, the engine 8 is stopped accordingly, and the output value is also zero.

As is obvious from the above descriptions, the CPU 27a acts as a warm-up control unit and a continuation control unit.

As above, according to the embodiment, when the engine 8 is first started after the traveling system is started as a result of the automobile entering the READY state, the engine 8 is not stopped until the prohibition time elapses; namely, until EV prohibition control ends. The engine catalyst 24 thereby becomes sufficiently active within the period of engine operation concomitant with first activation of the engine. A purified automobile gas emission can be emitted as expected even at the re-start of the engine 8.

The time period of the catalyst warm-up mode is not simply extended in the embodiment. After the end of first EV prohibition control, the engine 8 is controlled such that an output value more than the lower limit value is obtained as required. When the time period of the catalyst warm-up mode is extended, the engine 8 cannot sufficiently output drive force for letting the automobile 100 travel and the drive force of the generator 11, which may cause a significant drop in SOC of the high voltage battery 12. In the embodiment, however, the engine 8 can sufficiently output, after the end of the catalyst warm-up mode, drive force for letting the automobile 100 travel and drive force of the generator 11. Accordingly, excessive withdrawal of power from the high voltage battery 12 will not occur.

In addition, in the embodiment, the prohibition time is changed in accordance with the relationship illustrated in FIG. 5 and in conformance with the temperature of the coolant. Accordingly, a time for making a catalyst active can be set in accordance with warming up of the engine. Compared with a case where the catalyst is simply made active in only a predetermined time, unwanted activation of the catalyst can be avoided.

The embodiment can be practiced variously as follows.

Although the prohibition time can also be made constant regardless of the coolant temperature, it is better, as mentioned above, to make shorter the prohibition time with an increase in coolant temperature.

A length of the prohibition time can also be set on the basis of a condition other than the coolant temperature; for instance, a temperature of the engine catalyst 24 or in consideration of a plurality of conditions.

The invention is not limited to the embodiment as it is and can be embodied in an implementation phase by deformation of constituent elements without departing the gist of the invention. Further, various inventions can be created by an appropriate combination of a plurality of constituent elements described in connection with the embodiment. For instance, some of the constituent elements can also be deleted from all of the constituent elements described in connection with the embodiment. In addition, the constituent elements pertinent to the plurality of embodiments can also be combined together as required.

As above, the present invention enables provision of an engine controller capable of curtailing contents of hazardous substances in the automobile gas emission.

What is claimed is:

1. An engine controller of a hybrid vehicle including a motor that rotates a drive wheel and a generator that generates electric power by being driven by an engine, comprising:
    one or more processing devices and one or more memory devices storing instructions to:
    perform a first warm-up operation by continuously operating the engine while limiting an output value of the engine within a predetermined warm-up output value until an integration value of air intake of the engine comes to a predetermined integration value and continuing the electric power generation by driving the generator with the output value of the engine in order to warm up a catalyst provided in an exhaust system of the engine while rotating the drive wheel by the motor, when the engine is first started after start-up of a vehicle that travels by intermittently driving an engine on a basis of a request output value;
    perform a second warm-up operation subsequent to the first warm-up operation by continuously operating the engine for a predetermined period while rotating the drive wheel by the motor, the second warm-up operation including:
        (a) setting the output value as the request output value and driving the motor by using the electric power generated by the generator when the request output value is equal to or greater than a predetermined idling output value
        (b) maintaining the output value of the engine at the predetermined idling output value and charging the battery to warm up the catalyst when the request output value is less than the predetermined idling output value; and
    stop the engine, after lapse of the predetermined period, such that the vehicle travels solely by an output of the motor.

2. The engine controller according to claim 1, further comprising:
    a coolant temperature detection unit that detects a temperature of coolant of the engine,
    wherein, the predetermined period is set on a basis of the temperature of the coolant of the engine when the engine is started, and
    sets the predetermined period shorter as the temperature of the coolant when the engine is started increases.

3. The engine controller according to claim 1, wherein the generator is driven by means of an output of a difference between the predetermined idling output value and the request output value when the request output value is less than the predetermined idling output value.

4. The engine controller according to claim 1, wherein the warm-up operation is performed after transiting from an EV mode in which the motor operates the drive wheel to a series mode in which the generator is driven by the engine to generate electric power.

5. The engine controller according to claim 4, further comprising:
    a clutch that disconnect a power transmission path in an open state of the clutch, the power transmission path transmitting a driving forth of the engine to the drive wheel,
    wherein the warm-up is performed in the open state of the clutch.

* * * * *